United States Patent [19]

Scarpelli

[15] 3,639,259
[45] Feb. 1, 1972

[54] ENZYMATIC TREATMENT OF GELLED PROTEINACEOUS FILM MATERIAL

[72] Inventor: Joseph A. Scarpelli, Dayton, Ohio
[73] Assignee: The National Cash Register Company, Dayton, Ohio
[22] Filed: Apr. 9, 1969
[21] Appl. No.: 814,824

[52] U.S. Cl. ............................ 252/316, 71/64 A, 99/139, 99/140 R, 117/62.1, 117/100 A, 117/100 B, 252/522, 260/117, 424/36, 424/37
[51] Int. Cl. ..................... B01j 13/02, B44d 1/44
[58] Field of Search ................ 252/316; 424/36, 37; 117/100 A, 62.1; 260/117

[56] References Cited

UNITED STATES PATENTS

| 650,760 | 5/1900 | Metcalf | 424/37 |
| 3,089,828 | 5/1963 | Tsuk | 260/117 X |
| 3,324,002 | 6/1967 | Antonides | 424/36 X |

Primary Examiner—Richard D. Lovering
Attorney—E. Frank M. Kinney and Robert J. Shafer

[57] ABSTRACT

A method is disclosed for treating proteinaceous films or preformed capsule walls with proteolytic enzymes to afford cold-water solubility. According to the process of this invention, preformed films or capsule walls are partially degraded enzymatically, in an aqueous vehicle, to such a degree that the degraded proteinaceous material is rendered soluble in cold water at some desired or required temperature of use. Such treatment of already made films or capsule walls is contrasted with enzymatic treatment of proteins before manufacture of the films or capsule walls themselves.

10 Claims, No Drawings

ENZYMATIC TREATMENT OF GELLED PROTEINACEOUS FILM MATERIAL

BACKGROUND OF THE INVENTION

It has long been desired to manufacture cold-water soluble film or capsule walls of gelatin or gelling hydrophilic polymeric material. Specifically, it has been desired to manufacture a film of cold-water soluble microcapsule walls wherein the capsule walls enclose water-insoluble solid or liquid to be released at a later time. In specific capsule manufacturing processes to which this invention relates, water-soluble hydrophilic capsule wall materials have been used previously. Such previously used materials have presented processing and manufacturing difficulties which greatly increased the manufacturing costs and the final capsule product costs. Gelable hydrophilic polymeric materials have also been used to make capsules which have walls soluble in water;—the gelable material melting in water at certain, relatively high, temperatures. In order for those capsules which utilize gelable capsule wall material to have water dissolving properties, the water in which they are dissolved must be heated to a temperature higher than the melting or gelatin temperature of the capsule wall material. It is believed that the present invention overcomes or obviates all or most of the above-described difficulties in manufacturing capsules and capsule wall materials having cold-water soluble characteristics.

1. Field of the Invention

This invention relates to a treatment process to be performed on preformed proteinaceous film structures or capsule walls in order to render the proteinaceous material cold-water soluble. For purposes of this invention proteinaceous films will be considered to be similar in nature to proteinaceous capsule walls, although it may be apparent to those skilled in the manufacture of capsules that, in many well-known capsule wall materials, kind and amount of the components of some capsule walls may vary from the components which are generally present in films. In the present patent, the phrase "capsule walls" or "capsule wall materiial" will be used as a substitute for the more cumbersome phrase, "proteinaceous films and proteinaceous capsule wall material."

This invention further and more specifically pertains to such a process, that is a treating process for proteinaceous material wherein gelatin in a capsule wall material is partially degraded by the action of enzymes to increase cold-water solubility of the gelatin. The treatment is accomplished on preformed or already manufactured capsule walls. A concomitant effect of the treatment herein is a lowering of the melting temperature of the enzymatically degraded proteinaceous capsule wall material.

2. Description of the Prior Art

The general subject of enzymes and enzymatic reaction is well known. Reference is made, from example, to pages 460 to 468 and other pages in the textbook titled "Organic Chemistry" (Third Edition) by Fieser and Fieser, Reinhold Publishing Corporation, New York (1956). The enzymatic reactions with which the present invention is concerned are the enzymatic reactions which degrade proteinaceous materials. The above-referenced textbook teaches enzymatic degradation of proteins or, "proteolysis," as it is named therein.

U.S Pat. No. 2,828,402 issued June 10, 1968 on the application of E. A. Steigmann et al., discloses a decrease in the molecular weight of protein by action of a hydrolytic enzyme. The patent, however, discloses a combination of at least two gelatins, one of which is not degraded at all and another of which is degraded to such a degree that it can no longer gel in concentrated solution. The degradation is accomplished prior to combination of the gelatins and the patent does not disclose increased cold-water solubility of the gelled product.

SUMMARY OF THE INVENTION

This invention pertains to a treatment of preformed capsule walls of polymeric material to render those capsule walls relatively more water soluble. The invention more particularly pertains to an enzymatic treatment of such capsule walls. The invention specifically pertains to a treatment of capsule wall materials of proteinaceous matter and to the hydrolysis of such proteinaceous matter to render it more water soluble. In the preferred capsule wall materials, the proteinaceous material especially referred to is gelatin.

Capsule walls soluble in relatively cold water find special utility in many applications. Flavoring or fragrancing materials can be encapsulated for future release wherein the capsules need only be dispersed in cold water. Previously known capsules required rupture or dispersion in very hot water. Encapsulated flavoring can now be used in preparation of gelatin desserts or other foods at room temperature or below without the use of heat. Fertilizers, rodenticides, insecticides and other poisons, chemical reactants, pharmaceuticals, and veterinary medicines and many other materials can be encapsulated; and those capsules can then be subjected to the treatment of the present invention. In any case, and wherever there is a condition of utility requiring cold-water solubility or solubility in water at a lower temperature than has in the past been available, the treatment of this invention finds use. In some capsules of the prior art, it was difficult to contain certain internal phase materials in capsule walls and maintain continued cold-water solubility. Such was the case even when chemically modified gelatins were used. Those difficult-to-contain internal phases have as one or more components, aldehydic materials which react with capsule walls and, to some degree, increase the water insolubility by cross-linking the proteinaceous component of the capsule wall material. In using the treatment of this invention, the effect of cross-linking reaction by the aldehydic components of some capsule internal phases will be diminished. In all cases using the present invention, treated gelatin capsule wall material, even after cross-linking by aldehydic materials, is more cold-water soluble than was the wall material before the treatment.

A very important feature of the present invention is the discovery that already formed preformed capsule walls can be treated to render those preformed capsule walls soluble in water at relatively lower temperatures. Gelatin already formed into capsule walls and then treated by the enzymatic reactions of this invention remain in form of capsule walls even though the gelatin is partially enzymatically hydrolyzed and is, therefore, more water soluble and has a lower melting temperature. It has been found very difficult or impossible to adequately treat gelatin which has not already been formed into capsule walls using the enzymatic treatment of this invention and then subsequently use that treated gelatin material to manufacture capsule walls.

An object of the present invention is to provide a process for treating preformed capsule walls to render the capsule wall material soluble.

A more specific object of the invention is to provide a treatment for proteinaceous material in capsule walls wherein enzymes are used to hydrolyze the protein.

Another object of the invention is to provide capsules having water soluble walls; specifically capsules with walls treated by enzymes in order to partially degrade the proteinaceous components of the capsule wall material. A more specific object of the present invention is to treat gelatin in capsule walls with peptidases in order to partially degrade the polypeptide linkages of the gelatin capsule wall material.

Other objects will, in part, be disclosed hereinbelow and will, in part, be apparent to those skilled in the art having the benefit of the present teaching.

Enzymes can be viewed as catalysts produced by living organisms which enzymes control the chemical reactions and processes associated with the life of those living organisms and the life of other living organisms. Enzymes appear to fall into two broad divisions or categories: hydrolases which control hydrolysis of esters, carbohydrates, proteins, and amides; and oxidases which appear to control various oxidation-reduction reactions. The process of the present invention is concerned with enzymes of the former type, that is, hydrolases. It is, however, conceivable that the oxidative enzymes could also be used in a treatment reaction wherein capsule wall or film material would be manufactured of a substrate reactive with those oxidative enzymes. Even more specifically, the enzymes utilized in the present process are hydrolytic enzymes selected for their specific action on proteinaceous material. Such enzymes are generally referred to as proteases and in the category "proteases" are included "proteinases" and "peptidases." In a still more complete categorization of the enzymes useful in practice of the process of the present invention, it should be pointed out that there are two general types of enzymes which are named as to the location of their activity on a substrate molecule. Exopeptidases affect only terminal peptide groups, while endopeptidases affect centrally located peptide groups. The enzymes useful in the process of the present invention are endopeptidases and examples of endopeptidases include pepsin and trypsin. As has been previously pointed out, treatment of the present invention must be performed on already manufactured capsule walls. Attempts to partially degrade gelatin by the use of enzymes and then use that partially degraded gelatin in the manufacture of capsules—especially in the manufacture of capsules by liquid-liquid phase separation process—cannot be expected to achieve a high degree of success. If such attempts do not fail completely, then capsule walls made by the liquid-liquid phase separation of enzymatically degraded gelatin can, at least, be expected to be so low in quality as to render the capsules virtually useless for most applications.

Capsules eligible for use in practice of the present invention include capsules manufactured according to the process disclosed and claimed in U.S. Pat. No. 2,800,457 issued July 23, 1957 on the application of Barrett K. Green and Lowell Schleicher, and assigned to the assignee herein. The capsules of that invention contain oils or oily materials which are substantially water insoluble and the capsule wall materials of that invention constitute a complex combination of at least two oppositely electrically charged hydrophilic polymeric materials. In the preferred embodiment of the process of that invention the two oppositely charged polymeric hydrophilic materials are gelatin and gum arabic. The gelatin and gum arabic of those capsule walls were combined as a complex coacervate in an aqueous capsule manufacturing vehicle and deposited about liquid droplets of the intended capsule internal phase;—the entire process being carried out in an aqueous manufacturing vehicle.

Capsules disclosed in U.S. Pat. No. 3,317,434 issued May 2, 1967 on the application of Arthur Veis et al., can also be used in the process of this invention. Capsule walls disclosed therein comprise two different kinds of gelatin material, that is gelatins having two different isoelectric points. The gelatin materials are combined by complex coacervation and the capsules are manufactured in an aqueous manufacturing vehicle. In the case of the Veis et al. capsules, the enzymatic treatment of the present invention will partially degrade both components of the capsule wall material.

Capsules made according to U.S. Pat. No. 3,341,466 issued Sept. 12, 1967 to Carl Brynko et al., can be used in the process of this invention. Said patent to Brynko et al. discloses a particular process for making large capsules having walls which include gelatin capsule wall material complexed with other, oppositely charged, hydrophilic polymeric material.

It should be noted that although the capsules manufactured by the processes of the three above-mentioned patents include gelatin complexed with another oppositely charged hydrophilic polymeric material; the process of the present invention is not limited to treatment of gelatin wherein the gelatin is complexed with another material. Capsules manufactured according to the process disclosed in U.S. Pat. No. RE24,899 issued Nov. 29, 1960 on the application of Barrett K. Green can be treated by the process of this invention. A capsule product of one embodiment of that process includes one kind of gelation as the only polymeric capsule wall constitutent. Also, it should be pointed out that capsules manufactured according to the process disclosed and claimed in U.S. Pat. No. 3,116,206 issued Dec. 31, 1963 on the application of Carl Brynko and Joseph A. Bakan and assigned to the assignee herein, can be treated by the process of the present invention. The capsules of the above-mentioned Brynko and Bakan patent include capsule walls of zein which is a prolamine film-former derived from the seed of zea maya, a grain commonly called Indian Corn. Proper selection of enzymes and process conditions permits practice of the present invention wherein the zein will be partially degraded in order to provide capsule walls which are cold water soluble.

It should now be apparent that any capsule wall material which contains proteinaceous material can be treated by the process of the present invention and should be considered to be included within the scope and ambit of the disclosure and claims appended hereto.

As hereinbefore stated, the enzymes useful in practice of the present invention are named proteases. Proteases hydrolyze protein molecules at peptide linkages and cleave the molecules into simpler peptides and proteins. That class of protease enzymes can be broken into two further classes, that is, peptidases which hydrolyze peptides into alpha-amino acids; and proteinases which hydrolyze proteins into polypeptides. The proteinases include many of the more widely known enzymes and those which are most preferred for use in the practice of this invention. Examples of those proteinases are materials such as pepsin, trypsin, ficin, bromelain, papain and rennin. Chymotrypsins of the endopeptidase or aminopeptidase type are also eligible for use in practice of the present invention. Other commercially available enzymatic materials are also eligible for use in practice of the present invention although the exact composition of those commercially available materials is not always available in terms of the various kinds of enzymes, the concentrations used in the product and the form in which it is provided. An example of eligible, commercially available, proteolytic enzyme products is a series of such materials sold by Rohm & Haas, Philadelphia, Pennsylvania, U.S.A. The materials are sold under the trade name "Rhozyme" and are eligible for use in practice of the present invention. In fact, certain of those members of the "Rhozyme" series will be used in the preferred embodiments described below.

It must be understood that enzymatic materials are naturally occurring and may, therefore, have varying activities with respect to their effect on proteinaceous matter. Such varying activities give rise to the necessity for simple experimentation in developing conditions and parameters for capsule wall treatment. For each individual sample of an enzymatic material, an assay of the enzyme and its activity on a specific substrate or gelatin capsule wall material must be conducted in order to determine the concentration of enzymatic material and other conditions of reaction to be used in the capsule wall treatment. Having empirically determined the parameters of reaction, then the treatment process can be repeatedly and reproducibly conducted. The testing for enzymatic activity and efficiency of the reaction with a particular substrate material is simple and is conducted by techniques well known to, or easily understood by, those skilled in the art. Once having been made aware of the testing procedures and techniques employed to determine the activity of the enzymatic materials to be used on particular substrate, one skilled in the art can easily and routinely perform such tests without further instruction. In performing the test, samples of capsules which have walls containing gelatin material to be treated are immersed in varying concentrations of the enzyme solution, having a pH and a temperature which are known to be near those optimal for the particular enzyme being used. The solutions are aqueous solutions and the immersion of the capsule samples includes swelling the capsule wall material and permeation of those swollen walls by the enzyme solution. After immersion of the sample capsules, portions of the capsules are removed from the enzyme solution at regular periods (for example, every 15 minutes). Those capsules are dried by standard procedures well known in the art and reviewed hereinbelow in the section titled "Examples of Preferred Embodiments."-materials;—dried capsules are then immersed in water at some predetermined temperature such as 30° C. and the time required for the capsule walls to dissolve in that water is recorded as a function of the immersion time in the enzyme solution. In this way the required immersion time can be determined for a particular set of conditions in order to provide treated capsule walls which dissolve in a certain desired or required length of time after immersion in an aqueous solution. It must be understood that exact details of the process as to the exact pH, exact time and exact concentration of the enzyme material cannot be completely described due to the differences in substrate materials for the capsule wall and differences between enzyme materials themselves.

One certain requirement for the capsule wall material is that the capsule wall material must contain at least one proteinaceous material. The proteinaceous material of the capsule walls can be chemically cross-linked or not and can include other, nonproteinaceous, material or not. The enzyme used in the process of this invention is selected to hydrolyze proteins and specifically gelatin materials despite the possible presence of other materials in the capsule wall.

Operable pH ranges for the aqueous treatment solution of enzymatic material used in practice of this invention may vary considerably for different substrate materials and for different enzyme materials; —an example being that trypsin is reported to be most active from pH about 5 to about 9—with the maximum activity at about pH 7. Papain is most effective at a pH of about 5 but has some effect at a pH of about 7 and has shown activity on some substrates in alkaline solution. Some commercial enzymatic materials are active at a wide pH range, for example "Rhozyme P-11" (trade name) is active in a pH range from about 6 to about 9. The effective pH range for a particular enzyme is also dependent upon the substrate with which it is to be reacted. That is, the kind or type and amount of protein to be treated has an effect on the optimum temperature of the system, the kind of enzyme which should be preferred and possibly other factors such as salt concentration of the system. Enzymes can be found which are active at pH levels of from about 3 to about 10.

The most effective temperature of the treatment system may vary with differences in enzyme material also. As an example, rennin is not active as a proteolytic enzyme below a temperature of about 15° C. or above a temperature of about 55° C. Papain is reported to be most effective in a temperature range of about 60° to 90° C., with an optimum temperature being about 65° C. (all of this depends, of course, upon other factors and conditions in the system). As some enzymes are produced by, and used in, human body functions, it is not unexpected that human body temperature is the optimum temperature of reaction for some enzymes. Generally, however, enzymatic materials are active to some degree from a low temperature of about 10° to 15° C. up to a higher temperature of about 60° to 70° C.;—it being common to find that the rate of enzymatic hydrolysis of protein doubles with every 10° C. increase in the temperature of the system. This doubling-the-rate rule, however, applies only above a temperature where activation begins and below a temperature of inactivation. Inactivation occurs at a high temperature level where an enzyme no longer performs its hydrolytic activity. That temperature of inactivation also varies according to the age of the enzyme, the condition of the substrate, the pH and the concentration of treatment solution and all of the other various conditions and parameters discussed above. As an example of temperature of inactivation, it can be noted that pepsin, in solution, is quickly destroyed at a solution temperature of about 70° C. Trypsin loses approximately 75 percent of its potency in about 3 hours in solution at room temperature. As a practical matter, it must be pointed out that the treatment to be used in the practice of this invention must be made to occur at a solution temperature below the desired solution temperature of the capsule wall material. Otherwise, as the gelatin in the capsule wall material is degraded below a certain melting point temperature or solubility level, the capsule wall materials will go into solution and there will be no capsule wall to treat.

The time or duration required for treatment of gelatin-containing capsule walls depends upon all of the above considerations and also on the enzyme age and concentration. In general, the time of treatment must be experimentally determined as was described above. Although treatment times are experimentally determined, in normal treatment conditions using the enzymes and substrate materials generally encountered, treatment times may vary from less than about 15 minutes to 4 hours or more;—regulation of the treatment time by varying other parameters or conditions being mostly a function of economical considerations. It can be understood that higher concentrations of enzymatic materials will cause a decrease in the time or duration of processing required in order to attain the desired treatment results.

As previously stated, optimal concentration for enzyme materials can be experimentally determined. However, as a general rule, concentration of the enzymatic materials used in practice of this invention can range from less than about 0.01 percent, by weight, to more than about 1.0 percent, by weight, depending on the desired results, on the enzymes and other conditions such as pH, temperature and the amount of substrate to be treated. It is to be understood that enzymatic treatment compounds might contain fillers, buffers or other inactive constituents and the above given percentages relate to the active enzyme material and not to such filler material that might be included in the enzyme composition. It should also be remembered that all of the above conditions are important and that all of the conditions are interdependent and interact on one another.

A broad process for treatment is taught herein to the extent that enzyme materials are used to partially degrade preformed gelatin-containing capsule wall material. However the specific treatment, that is definition of specific and well defined conditions of reaction, must be empirically determined by simply conducted experiments. Use of the experiments, as hereinabove described, results in specific conditions under which the process of the present invention can be practiced.

The process, after having proceeded to the degree of degradation of proteinaceous capsule wall material desired, must be inactivated. Inactivation of the treatment solution generally includes some change of conditions, such that the enzyme can no longer react with the proteinaceous constituent of the capsule wall material. Inactivation includes such things as a change in temperature of the system, for instance increase of the temperature to about 75° C., or higher for periods of 15 to 20 minutes, acidification of the system, alkalization of the system, addition to the system of a peroxide, addition to the system of chelating or sequestering agents such as ethylenediaminetetraacetic acid or increase in ionic strength of the treatment solution. Obviously, in practice of the present invention, inactivation cannot be accomplished by increase in temperature because heating the system will melt and dissolve the treated capsule walls.

If desired or required, coenzymes or activators can be used in conjunction or in concert with the proteolytic enzymes useful in this invention. Such coenzymes and activators are well known and their results are well known, such as in the case of cystein-activated papain, and need not be described herein.

DESCRIPTION OF PREFERRED EMBODIMENTS

Example A

As an example of a reduction of gel strength, that is, a reduction in the strength of a gelled gelatin sample and, therefore, as a demonstration of a decrease in the gelation temperature of a solution of gelatin; a series of aqueous solutions of gelatin having a concentration of approximately 6 percent, by weight, gelatin was prepared including varying amounts of pepsin (an enzyme eligible for use in the practice of this invention). The liquid gelatin solutions were maintained at a temperature of approximately 30° C., for about 4 hours at a pH of approximately 4.5. At the end of the 4 hour duration, no attempt was made to inactivate the enzymes and terminate the enzymatic hydrolysis reaction. The samples were chilled in a refrigerator and were then tested for gel strength. Gel strength was measured using a Bloom Gelometer which is a device well known to, and commonly used by, workers skilled in the art. Measured values of Bloom strength have units of grams and serve as relative indicators of the strength of a gel as a function of resistance of the gel to penetration by a probe. A suitable test procedure for determining Bloom strength is disclosed in Industrial and Engineering Chemistry, Analytical Edition, Volume II, Page 348. The results are indicated in the table below and are tabulated as to the amount of pepsin per gram of gelatin compared to Bloom strength of the various samples of gelatin.

| Grams of Pepsin/Grams of Gelatin | Bloom strength (Grams) |
|---|---|
| Control (no pepsin) | 309 |
| 0.01 | 214 |
| 0.02 | 168 |
| 0.05 | 74 |
| 0.10 | 20 |
| 0.20 | Not Gel. |

In a graphical representation of the results of the above tests wherein the abscissa represents Bloom strength of the gelled gelatin solution, in grams, and the ordinate represents the logarithm of the corresponding concentration of grams of pepsin per gram of gelatin in solution, a straight-line function is obtained. Such a straight-line graph can be used to predict the strength of a gelatin-containing capsule wall after treatment using particular enzymes on a particular gelatin material according to the process of this invention. It must be emphasized, however, that the enzyme-treated gelatin solutions of this example could not be used to make capsules having gelatin-containing walls which were cold water soluble and which had certain desired physical characteristics. The above example A is useful only in predicting the sort of results which can be obtained in treating capsule wall materials which have a certain amount and kind of gelatin using a certain enzyme at a certain concentration in the solution. The following examples disclose specific treatments of capsules using specific kinds of enzymes.

Example 1

Capsules for use in performing the treatment of this invention were made as follows: 180 milliliters of an 11 percent, by weight, aqueous solution of gelatin was combined with 180 milliliters of 11 percent, by weight, aqueous solution of gum arabic in a vessel containing 500 milliliters of distilled water. The gelatin used was acid-extracted pigskin gelatin having an isoelectric point of approximately pH 8 to 9 and a Bloom strength of approximately 285 to 305 grams. The aqueous gelatin and gum arabic system was placed under condition of agitation distillate and heated to a temperature of approximately 50° C. The pH was found to be approximately 4.5 and no adjustment was made thereto. Two hundred and fifty milliliters of a petroleum distillate fraction known as cleaner's naphtha and sometimes also known as Stoddard solvent was introduced into the agitating aqueous solution of gelatin and gum arabic. The agitation was adjusted to make droplets of the petroleum distillate having diameters of approximately 100 to 300 microns. While maintaining agitation, they system was slowly cooled to a temperature of about 15° C., thereby, forming capsules. It should be pointed out, at this time, that any water insoluble material, whether liquid or solid, can be used as the internal phase for capsules treated by the process of this invention. The only requirement, other than the requirement for water insolubility is that the capsule internal phase must not be reactive with the enzymes used to treat the capsule wall material. In other words, the capsule-contained material cannot be such as to either inactivate the enzymes or such that the enzymes will degrade or react with the material to an extent that the contained material will then be useless.

To the agitating system of capsules, maintained at a temperature of about 15° C., 2 grams of pepsin are added and the agitation is maintained for about 90 minutes. After the 90-minute treatment the still-agitating capsule preparation is chilled to about 5° to 10° C., and the agitation is stopped. The capsules are permitted to separate from the aqueous manufacturing vehicle containing the residual capsule wall materials and the unused pepsin enzyme. The aqueous manufacturing vehicle is removed by decantation and is replaced by an equal volume of one molar aqueous sodium sulfate solution having a temperature of approximately 25° C. The agitation is recommenced and is continued for a period of approximately 12 hours. After the period of 12 hours agitation, the capsules are filtered on a Buchner funnel and the resulting filter cake of capsules is crumbled and placed on a sieve through which air is forced in order to dry the capsule walls. The above-treated capsules are observed to dissolve in water at a temperature of 25° to 28° C. in about 5 to 10 minutes. As a comparison, the same kind of capsules without the above-described treatment with pepsin, require water having a temperature of from 38° to 40° C. in order to dissolve in the same time, that is, in 5 to 10 minutes.

Example 2

In this example, capsules made by the same process using the same materials in the same amount as those capsules of example 1, are treated during the 90-minute duration using 1 gram of a commercially available enzyme sold by Rohm & Haas under the trade name of "Rhozyme P-11." One gram of the commercial enzyme is used in the place of two grams of pepsin used in example 1. After the 90-minute treatment, the capsules are dried in substantially the same manner as in example 1 and the times for solution of treated capsules using the "Rhozyme" enzyme material are found to be substantially the same as the time for solution of the pepsin-treated capsules of that example.

It should be understood that the 12 hours of stirring and contact with one molar sodium sulfate solution, as is practiced in the examples is unnecessary and is conducted only for purposes of convenience in the processing. Immediately after the 90-minute treatment, the capsules can be filtered and the capsule walls can be dried according to the description included in examples 1 and 2, above. The temperature of treatment could have been increased a small amount, so long as the the temperature was maintained below the temperature at which the gelatin of the capsules wall material would dissolve. The concentration of enzymes can be increased to decrease the treatment time necessary for the particular results desired or required and the pH of the treatment system can be changed. The pH of the treatment system in these examples is approximately 4.5 and if the pH is increased, the time for treatment would be appreciably decreased. However, such a change in pH condition or in the kind of enzyme material has been found to sometimes adversely affect the permeability characteristics of the capsule wall material, once dried.

What is claimed is:

1. A process for treating gelled proteinaceous material in a preformed capsule wall to render the gelled material water soluble at a lower dissolving temperature than before the treatment including the steps of:
   a. immersing capsules having walls to be treated in an aqueous solution of protease, said aqueous solution having a temperature below the dissolving temperature;
   b. maintaining the immersion below the dissolving temperature for a time adequate to permit hydrolysis of the proteinaceous material to the degree desired for solution at the dissolving temperature; and
   c. inactivating the protease such that the enzyme can no longer react with the gelled proteinaceous material.

2. A process for treating gelled gelatin material in a preformed capsule wall to render the gelatin soluble in water at a lower dissolving temperature than before the treatment including the steps of:
   a. immersing capsules having walls to be treated in an aqueous solution of protease, said aqueous solution having a temperature below the dissolving temperature;

b. maintaining the immersion below the dissolving temperature for a time adequate to permit hydrolysis of the gelatin to the degree desired for solution at the dissolving temperature; and
c. inactivating the protease such that the enzyme can no longer react with the gelled gelatin material.

3. A process for treating gelled gelatin material in a preformed capsule wall to render the gelatin water soluble at a lower dissolving temperature than before the treatment including the steps of:
 a. immersing capsules having walls to be treated in an aqueous solution of protease, said aqueous solution having a temperature below the dissolving temperature;
 b. maintaining the immersion below the dissolving temperature to partially hydrolyze the gelatin by reaction with the protease; and
 c. inactivating the protease such that the enzyme can no longer react with the gelled gelatin material.

4. The process of claim 3 wherein the protease is an endopeptidase.

5. The process of claim 3 wherein the protease is a proteinase.

6. The process of claim 3 wherein the dissolving temperature is below about 30° C.

7. The process of claim 3 wherein the immersion is maintained for from about 15 minutes to about 4 hours.

8. The process of claim 3 wherein the concentration of protease in aqueous solution is from about 0.01 to about 1.0 percent, by weight.

9. The process of claim 3 wherein the pH of the aqueous solution of protease is from about 3 to about 10.

10. The process of claim 3 wherein the protease is at least one taken from the group consisting of pepsin, trypsin, ficin, bromelain, papain, rennin and chymotrypsins.

* * * * *